United States Patent
Giraud et al.

(10) Patent No.: US 7,200,316 B2
(45) Date of Patent: Apr. 3, 2007

(54) CONNECTOR HOUSING FOR A COMMUNICATION NETWORK

(75) Inventors: William J M Giraud, Springtown, TX (US); Hubert B. Beamon, Haltom City, TX (US); Andrew G. Stanush, Fort Worth, TX (US); Terry L. Cooke, Hickory, NC (US); John B. Johnson, Hickory, NC (US); William R. Burnham, Hickory, NC (US); David C. Hall, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 115 days.

(21) Appl. No.: 10/903,746

(22) Filed: Jul. 30, 2004

(65) Prior Publication Data

US 2005/0111810 A1 May 26, 2005

Related U.S. Application Data

(63) Continuation-in-part of application No. 10/724,510, filed on Nov. 26, 2003, now Pat. No. 6,993,237.

(51) Int. Cl.
*G02B 6/00* (2006.01)
(52) U.S. Cl. ........................... 385/135; 385/134
(58) Field of Classification Search .................. 385/135
See application file for complete search history.

(56) References Cited

U.S. PATENT DOCUMENTS

| | | | | |
|---|---|---|---|---|
| 4,792,203 A | | 12/1988 | Nelson et al. ............. | 350/96.2 |
| 4,900,123 A | | 2/1990 | Barlow et al. ............. | 350/96.2 |
| 5,066,149 A | | 11/1991 | Wheeler et al. ............. | 385/135 |
| 5,100,221 A | * | 3/1992 | Carney et al. .............. | 385/135 |
| 5,109,467 A | * | 4/1992 | Hogan et al. ............... | 385/135 |
| 5,530,954 A | * | 6/1996 | Larson et al. .............. | 385/135 |
| 5,742,982 A | | 4/1998 | Dodd et al. .................... | 24/16 |
| 5,778,130 A | * | 7/1998 | Walters et al. .............. | 385/134 |
| 5,825,962 A | | 10/1998 | Walters et al. ............. | 385/135 |
| 5,946,440 A | * | 8/1999 | Puetz .......................... | 385/135 |
| 5,987,207 A | | 11/1999 | Hoke .......................... | 385/135 |
| 6,201,920 B1 | * | 3/2001 | Noble et al. ................ | 385/134 |
| 6,250,816 B1 | * | 6/2001 | Johnston et al. ............. | 385/53 |
| 6,385,381 B1 | * | 5/2002 | Janus et al. ................ | 385/135 |
| 6,438,310 B1 | | 8/2002 | Lance et al. ................ | 385/135 |
| 6,504,988 B1 | | 1/2003 | Trebesch et al. ............ | 385/135 |
| 6,631,237 B2 | * | 10/2003 | Knudsen et al. ............. | 385/134 |
| 6,748,155 B2 | | 6/2004 | Kim et al. ................... | 385/135 |
| 2002/0150372 A1 | * | 10/2002 | Schray ....................... | 385/135 |
| 2004/0240826 A1 | * | 12/2004 | Daoud et al. ............... | 385/135 |

* cited by examiner

*Primary Examiner*—Frank G. Font
*Assistant Examiner*—Ryan Lepisto
(74) *Attorney, Agent, or Firm*—Keith A. Roberson

(57) ABSTRACT

A connector housing for a communications network includes a housing assembly having a front panel, a rear panel, a first side panel, a second side panel, a bottom panel, and a top panel. In one configuration, the connector housing includes a jumper management panel that is rotatable into at least two different positions relative to the top panel of the housing assembly. In another configuration, the connector housing has a splice shelf assembly. The splice shelf assembly is attached to the housing assembly and rotatable about a vertical axis relative to the housing assembly. Another configuration of the connector housing has at least one cable entry plate that is removably attached to a side panel of the housing assembly. Additionally, one strain relief assembly has a furcation plug of a cable assembly that is attachable to a mounting rail for securing the same.

39 Claims, 12 Drawing Sheets

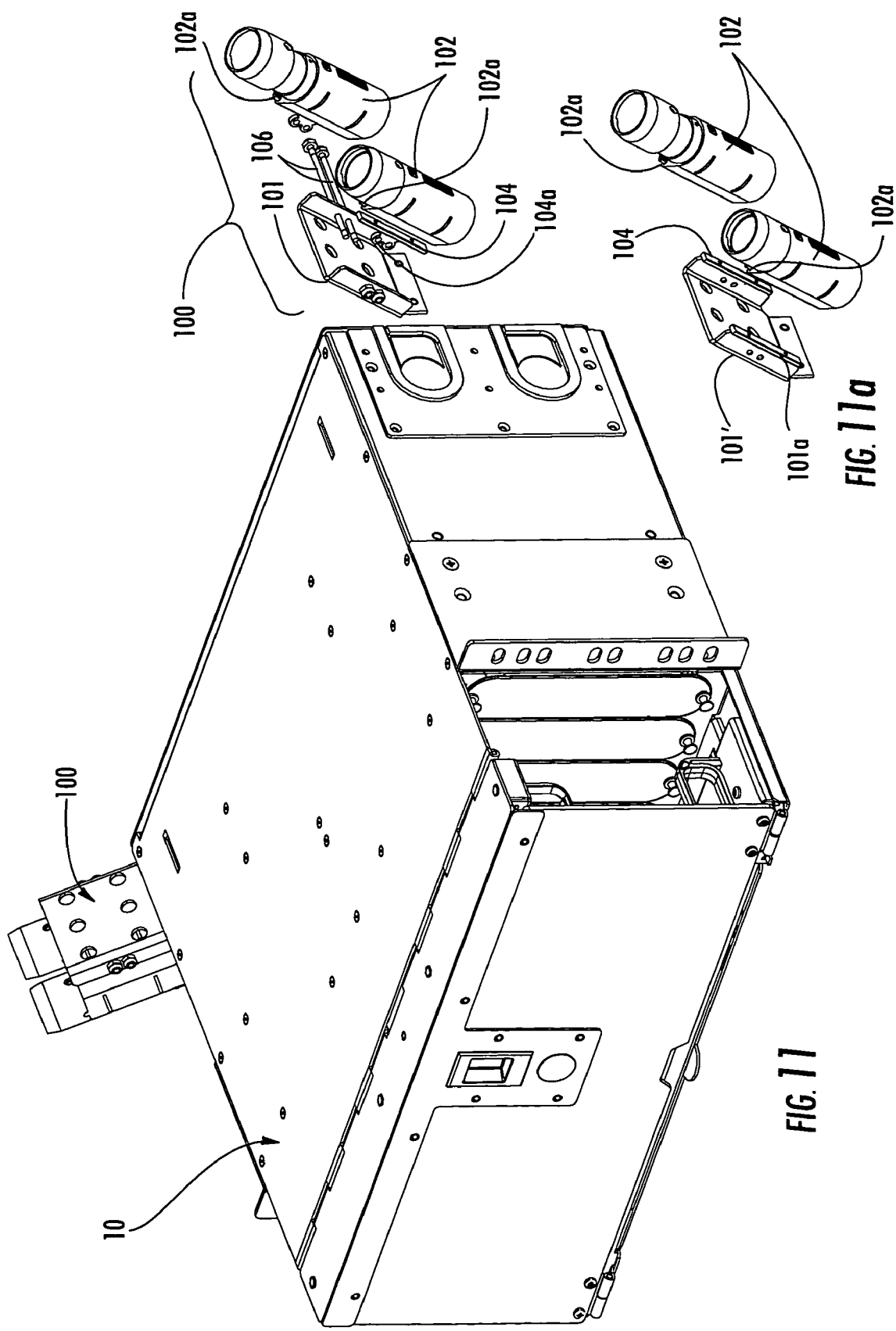

//PAGE START
CONNECTOR HOUSING FOR A COMMUNICATION NETWORK

RELATED APPLICATIONS

The present application is a Continuation-In-Part (CIP) of U.S. Ser. No. 10/724,510 filed on Nov. 26, 2003 now U.S. Pat. No. 6,993,237, the disclosure of which is incorporated herein in its entirety by reference.

FIELD OF THE INVENTION

The present invention relates generally to a connector housing for organizing, routing, and storing optical connections such as splices and/or connectors between optical waveguides.

BACKGROUND OF THE INVENTION

In telecommunication infrastructure installations, equipment for switching, cross-connecting and inter-connecting a variety of devices are used. Many of these devices are installed in telecommunication equipment racks, thereby permitting organized, high-density installations in a limited space. For instance, connector housings are installed in telecommunication equipment racks to allow the craftsman access to multiple connections at a single point. Connector housings allow the craftsman to perform necessary maintenance and/or reconfigure the communication network as necessary. It is desirable to have a high density of connections in a given space while still allowing the craftsman easy access, organization, and handling of connections and cables leading to and within the connector housing.

BRIEF DESCRIPTION OF THE FIGURES

FIG. 11 is a partially exploded view of the strain relief bracket assembly depicted in FIG. 10 with the cables removed.

FIG. 11a is a partially exploded view of another strain relief bracket assembly according to the present invention.

DETAILED DESCRIPTION OF THE INVENTION

Figure 1:
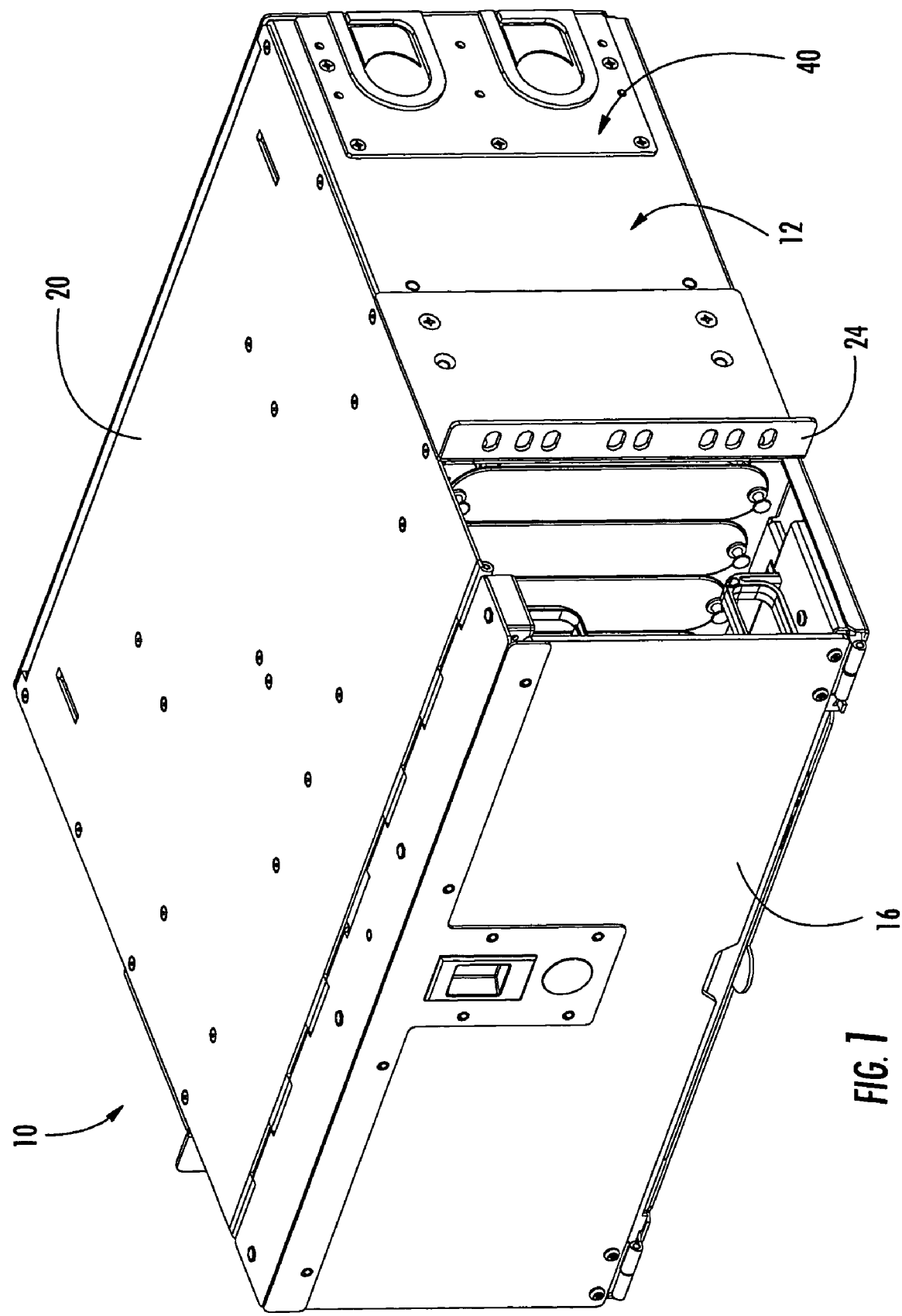
FIG. 1 is a front perspective view of a connector housing according to one embodiment of the present invention.
Figure 2:
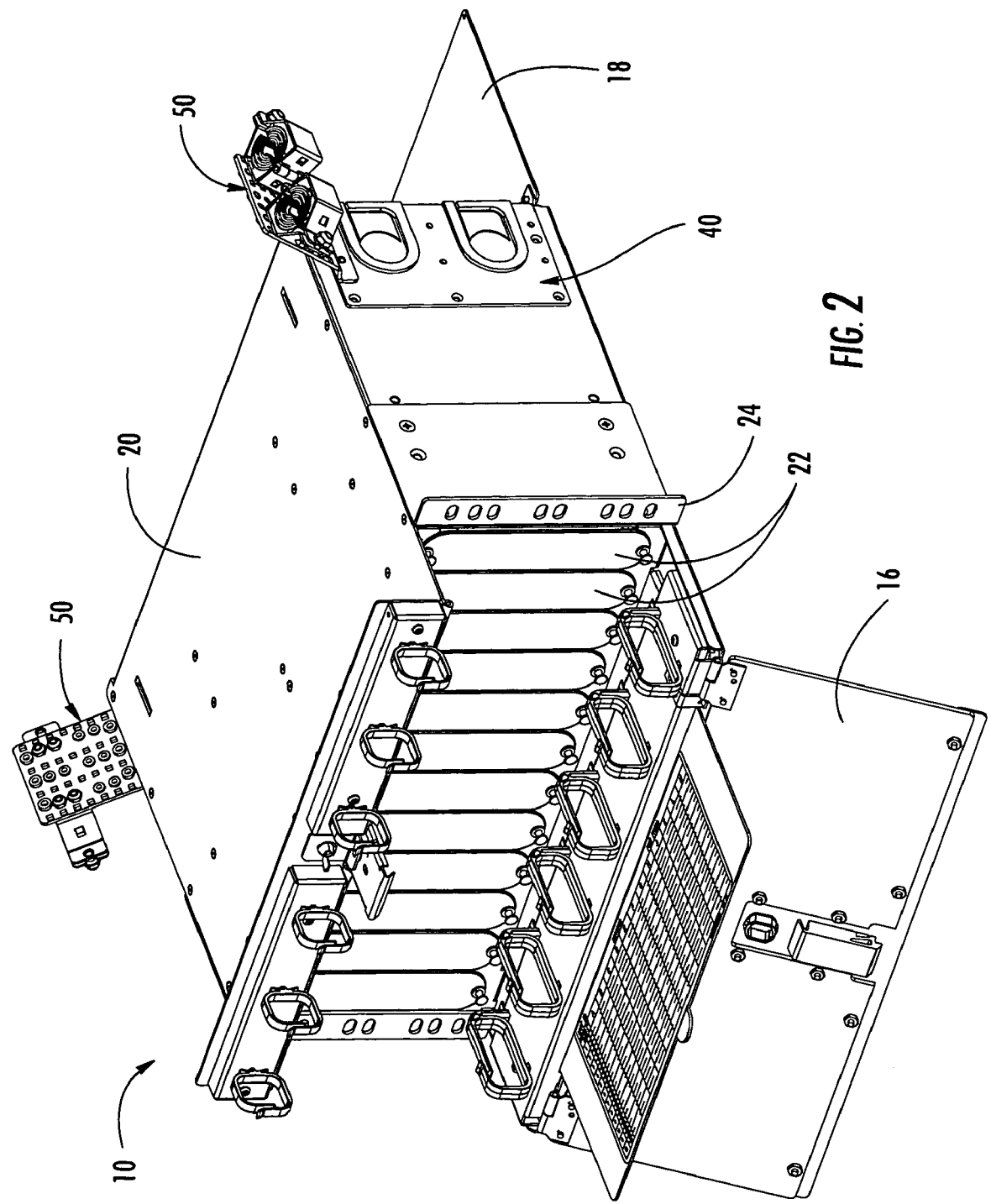
FIG. 2 is a front perspective view of the connector housing of FIG. 1 having with the front panel, the rear panel, and the jumper management panel in open positions with strain relief brackets.
Figure 3:
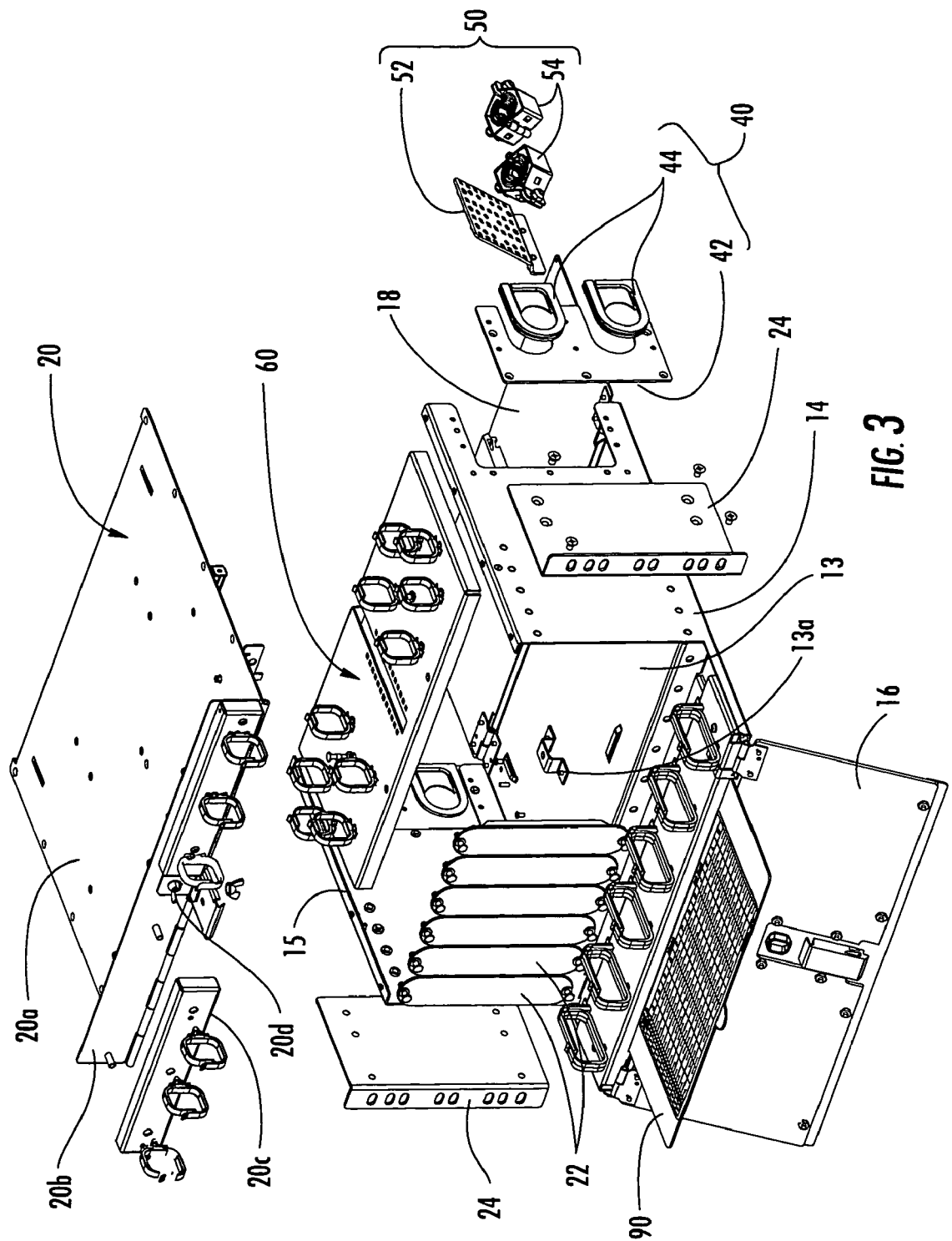
FIG. 3 is a front partially exploded, partially perspective view of the connector housing of FIG. 2.

Illustrated in FIGS. 1–3 is an exemplary connector housing 10 according to the present invention. Connector housing 10 is typically mounted to a distribution frame (not shown) and used for organizing, routing, protecting, and storing optical connections and cables of a communication network. As depicted in FIGS. 2 and 3, connector housing 10 includes a housing assembly 12, a pair of cable entry plate assemblies 40, at least one strain relief bracket assembly 50, and a fiber management shelf 60. In FIG. 1, connector housing 10 has the strain relief bracket assemblies 50 removed as would be typical for clearance purposes when installing the same into a distribution frame. As best shown in FIG. 3, housing assembly 12 includes a bottom panel 13, a first side panel 14, a second side panel 15, a front panel 16, a rear panel 18, a top panel 20, and a pair of rack mounts 24. The panels and sides of housing assembly 12 generally define an interior space of connector housing 10. Front and rear panels 16, 18 are rotatable from latched closed positions to open positions, thereby allowing the craftsman access to the interior space respectively from both the front and the rear. Cable entry plate assemblies 40 include a plate 42 and at least one grommet 44. Strain relief bracket assembly 50 includes a strain relief bracket 52 and at least one cable clamp 54. Of course, other configurations of the connector housing of the present invention are possible and intended.

Connector housing 10 has several advantageous features making it adaptable for different applications by changing configurations. For instance, top panel 20 includes a stationary portion 20a and a jumper management panel 20b that is rotatable relative to stationary portion 20a. Jumper management panel 20b includes a pair of panels 20c each having a plurality of cable routing guides (not numbered) attached thereon. However, jumper management panel may have other panel configurations thereon. In this embodiment, jumper management panel 20b is securable into either a generally vertical position or a generally horizontal position for organizing and routing cables to into the front of connector housing 10. As depicted in FIG. 3, jumper management panel 20b is in the generally vertical position and is secured in place using a bracket 20d having an L-shape with a stud thereon using a pair wing-nuts (not numbered). Of course, other configurations are possible for holding the jumper management panel in the vertical position. In the generally vertical position, jumper management panel 20b extends above stationary portion 20a of top panel 20. Moreover, jumper management panel 20b can be designed so that it is removable from connector housing 12.

Figure 9:
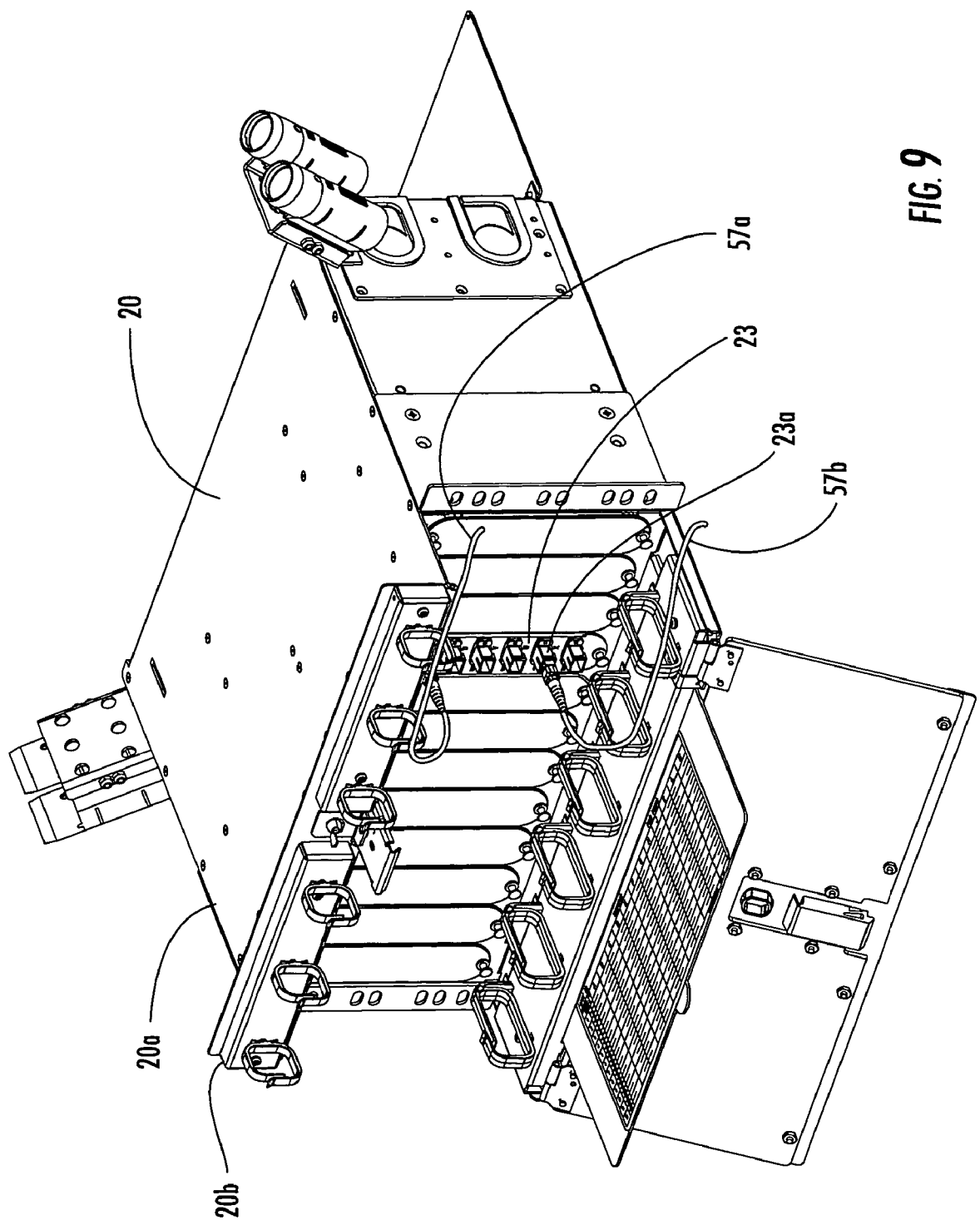
FIG. 9 depicts a plurality of cable assemblies being routed to the front of the connector housing of FIG. 1 with the addition of another configuration of strain relief bracket assemblies.

When jumper management panel is secured in the generally horizontal position it is generally flush with stationary portion 20a and bracket 20d is not necessary; instead, bracket 20d is stored by securing the same with the wing-nut that fastens jumper management panel 20b. FIG. 9 shows connector housing 10 with jumper mangagement panel 20b in a generally vertical position having a cable assembly 57a being routed through two cable routing guides of jumper management panel 20b to a first adapter 23a (not visible)

attached to an adapter panel 23. FIG. 9 also shows a cable assembly 57b being routed through two cable routing guides (not numbered) disposed on bottom panel 13 to a second adapter 23a on the same adapter panel 23.

Figure 4:
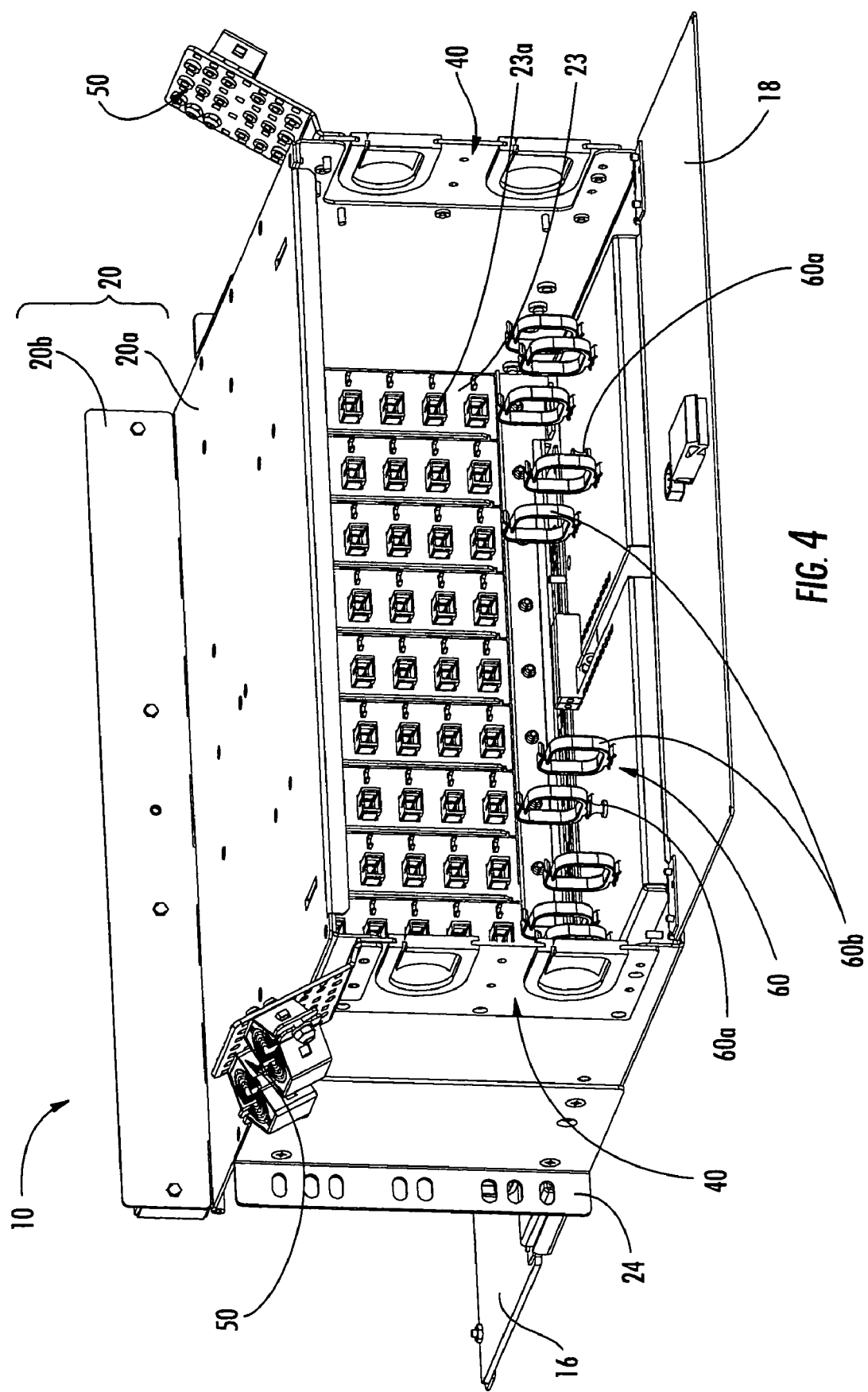
FIG. 4 is a rear perspective view of the connector housing of FIG. 1 with the substitution of a plurality of adapter panels for the blank panels of FIG. 1.

Connector housing 10 may also advantageously include at least one cable entry plate assembly 40, thereby allowing adaptability for different cable entry configurations at the sides of connector housing 10. Specifically, cable entry plate assembly 40 is removable so that a large number of smaller diameter cables can enter connector housing 10 from the side, rather than a small number of larger diameter cables. Illustratively, FIG. 4 depicts connector assembly 10 having both cable entry plate assemblies 40 respectfully attached to first and second side panels 14, 15. In other embodiments, a cable entry plate is not an assembly having grommets, but instead is merely a removable cable entry plate. As shown in FIG. 5a, a plurality of cables 55 are respectively secured and strain relieved at strain relief bracket assemblies 50. Strain relief bracket assemblies 50 include strain relief bracket 52 and at least one cable clamp 54. Cable clamp 54 can have any suitable design. A suitable cable clamp is disclosed in U.S. Pat. No. 5,742,982. From there, the cable proceeds to cable entry plate assembly 40 to enter an interior space of connector housing 10. Cable entry plate housing 40 includes a plate 42 having at least one grommet 44 that is soft and flexible, thereby inhibiting the cable from chaffing against a rigid edge. In this case, cable entry plate assembly 40 includes two grommets 44 so that multiple cables may enter a single side of connector housing 10. Moreover, cables may enter the connector housing from the top, the bottom, or both. If a cable was entering from below, a strain relief bracket assembly is attachable near the bottom of the connector housing side panel. With cable entry plate assemblies 40 attached, connector housing 10 is suitable for either a small number of larger diameter cables entering through grommets 44 or a relatively limited number smaller diameter cables entering through grommets 44. However, connector housing 10 may have more capacity for organizing and housing optical connections than can be provided in cables that can enter through grommets 44.

Figure 5:
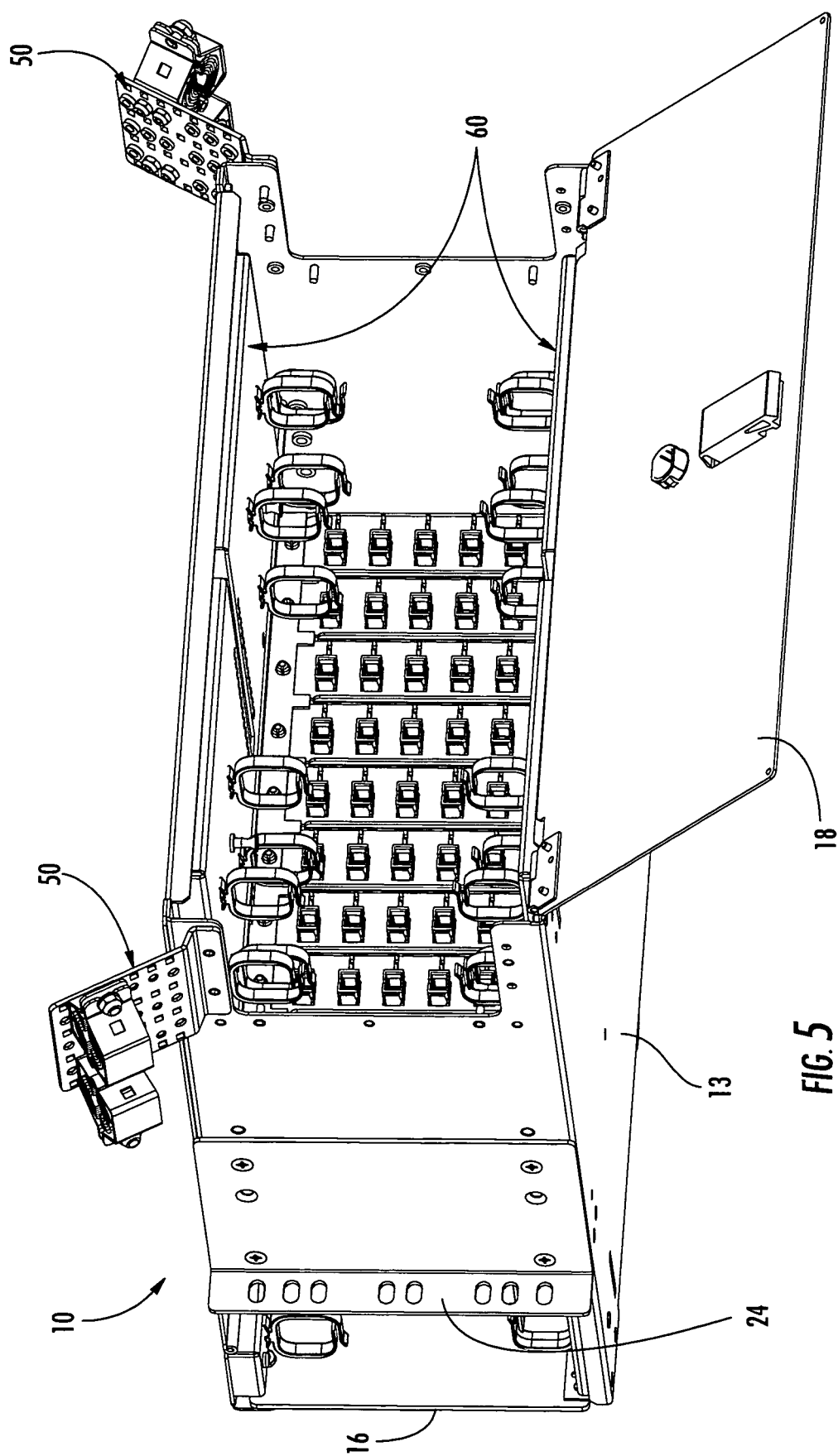
FIG. 5 is a rear perspective view of the embodiment of FIG. 4 with the cable entry plate assemblies removed.
Figure 5A:
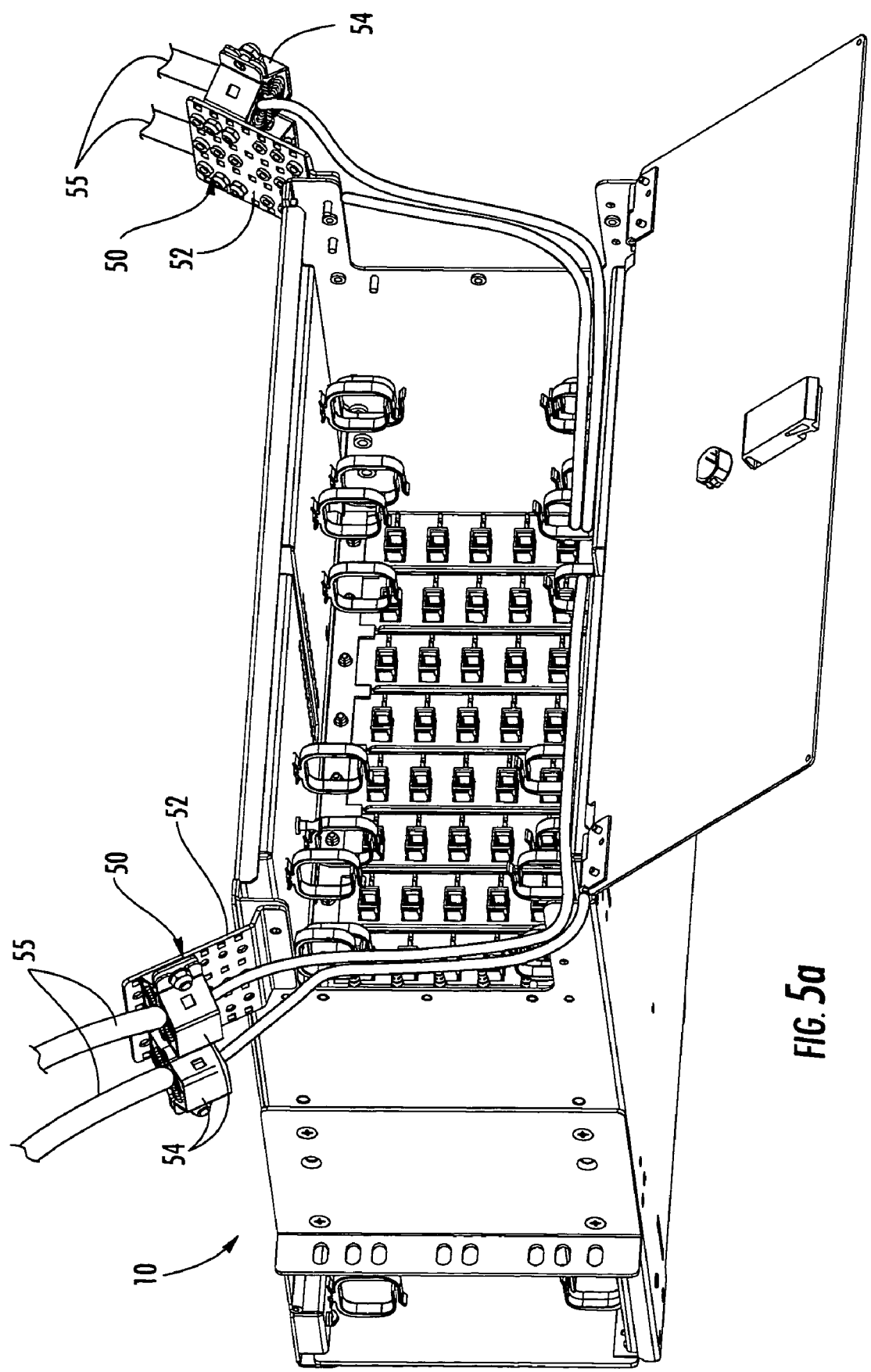
FIG. 5a depicts the connector housing of FIG. 4 having portions of cables being attached to respective strain relief bracket assemblies and entering the connector housing.

On the other hand, FIG. 5 shows a rear perspective view of connector housing having both cable entry plate assemblies 40 removed, thereby leaving larger cable entry areas compared with the area provided by grommets 44. In other words, because cable entry plate assemblies are removable a larger number of cables can enter connector housing 10, thereby utilizing the entire capacity of same. This feature is especially useful when connector housing is used for connecting a relatively large number of single fiber and/or low-count fiber cables. Additionally, when cable entry plate assemblies 40 are removed, strain relief bracket assemblies can still be attached to connector housing 10.

Figure 7:
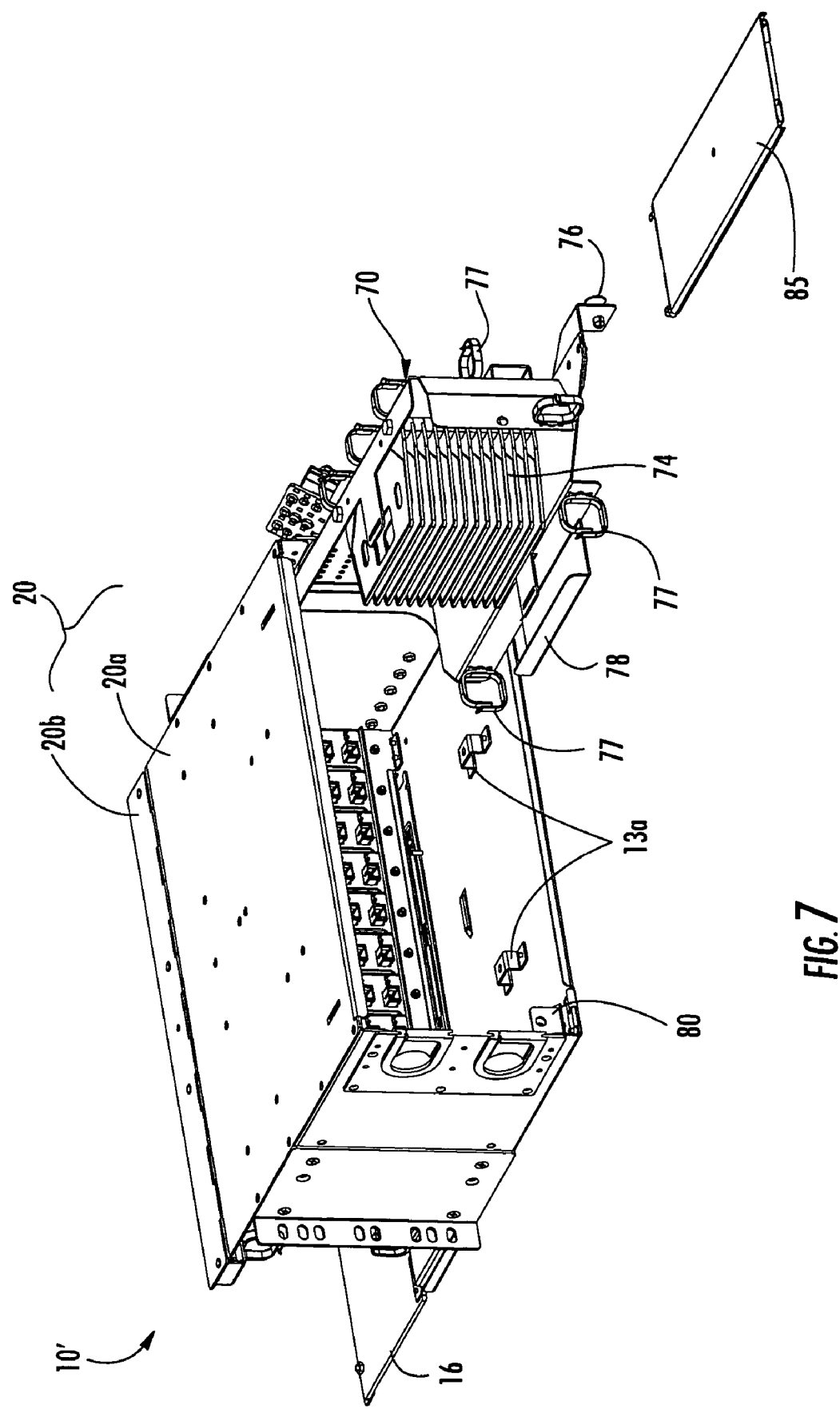
FIG. 7 is a rear perspective view of the connector housing of FIG. 6 with the addition of a splice tray that is removed from the splice shelf assembly.

Embodiments of the connector housing according to the present invention may also include one or more fiber management shelves 60 as best shown in FIGS. 4 and 5. Fiber management shelf 60 is removably attached to housing assembly 12 and allows for routing and organization of cables/optical waveguides that enter the connector housing from the sides at the rear. Specifically, fiber management shelf 60 includes at least one fastener 60a for securing it to housing assembly 12. In this embodiment, fiber management shelf 60 includes two push pin fasteners that engage brackets 13a on bottom panel 13 as best shown in FIG. 7. However any other suitable fasteners or attachment means can be used for securing fiber management shelf 60. Moreover, fiber management shelf 60 can be attached to other panels of housing assembly 12. For instance, FIG. 5 depicts two fiber management shelves 60 respectively attached to bottom and top panels 13, 20. Fiber management shelf 60 also includes a plurality of cable routing guides 60b and a plurality of apertures (not numbered) adjacent to a slot for attaching cable ties, thereby allowing for organization and grouping of cables/optical waveguides.

FIGS. 4 and 5 also depicts the connector housing of FIG. 1 having a plurality of adapter panels 23 each having pluralities of adapters 23a therein substituted for a plurality of blank panels 22 as shown in FIGS. 2 and 3. The plurality of adapters 23a are gang mounted on adapter panel 23, thereby increasing connection density. Adapters 23a are used for connecting and making optical connections between the cables/optical waveguides at the front of the connector housing and the cables/optical waveguides at the rear of the connector housing. Adapter panels 23 and blank panels 22 are attached to housing assembly 12 using fasteners (not numbered), preferably, fasteners that do not require tools and are quick and easy for the craftsman. In this case, adapter panels 23 and blank panels 22 use push pin fasteners near the top and bottom, thereby allowing the craftsman to quickly and easily remove the same.

Figure 6:
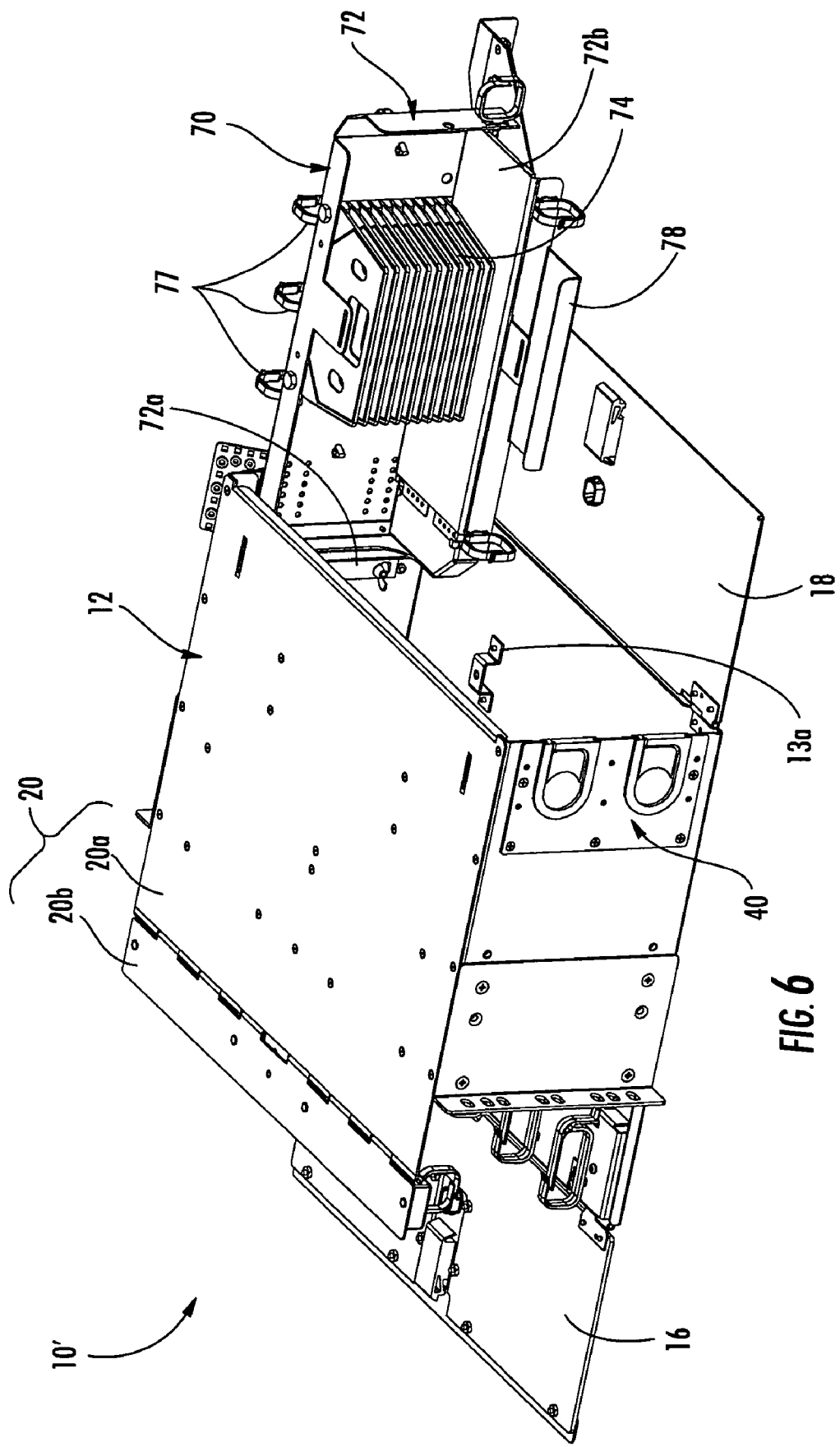
FIG. 6 is a side perspective view of another embodiment of a connector housing configured for splicing applications with an optional splice shelf assembly that is rotated into an exposed position.
Figure 8:
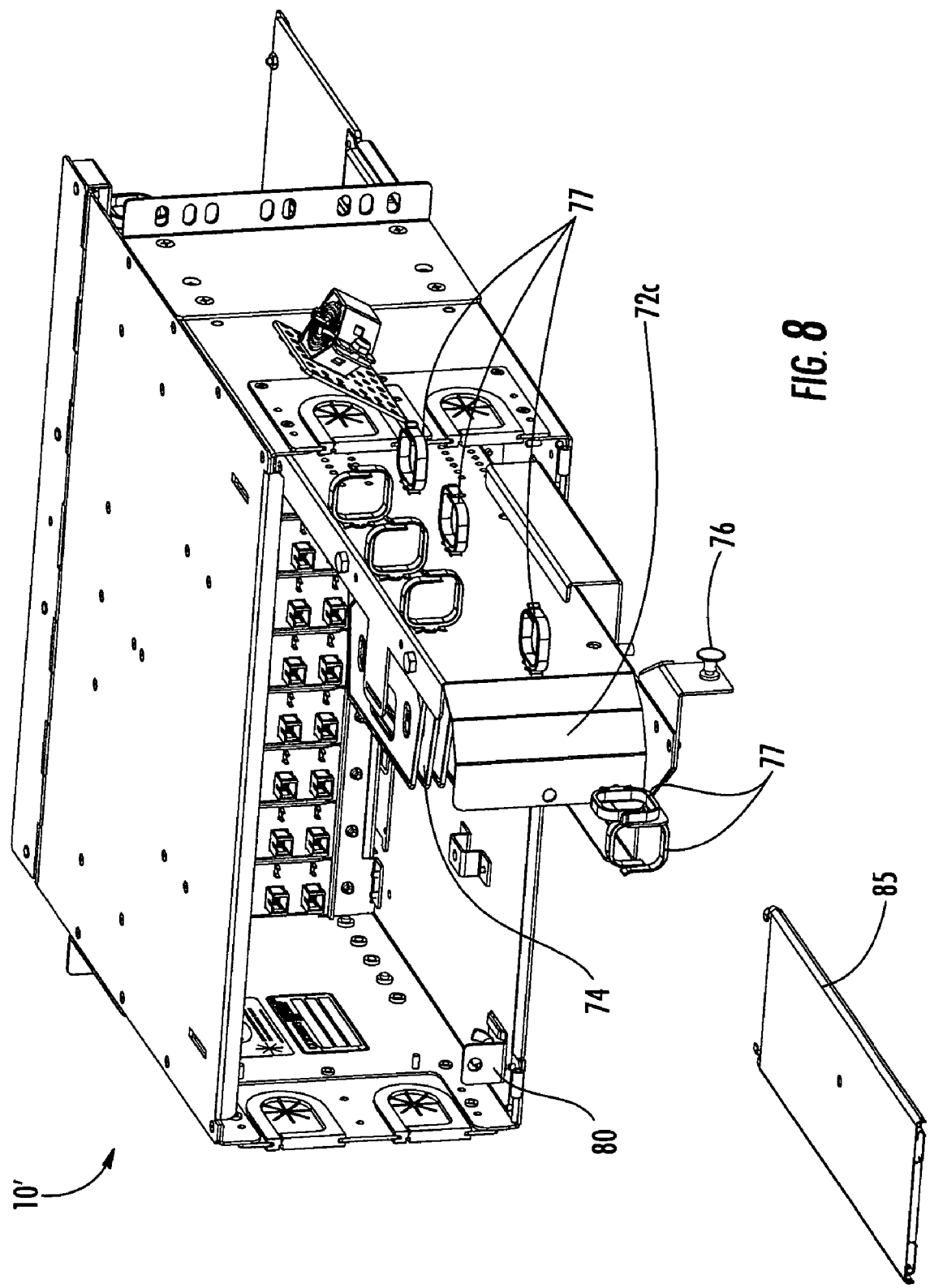
FIG. 8 is another rear perspective view of the connector housing of FIG. 6.

The present invention contemplates still other network configurations such as splicing at the connector housing. FIGS. 6–8 depict connector housing 10' which replaces fiber management shelf 60 of connector housing 10 with a splice shelf assembly 70. FIGS. 7 and 8 show connector housing 10 having rear panel 18 removed for the purpose of clarity. In this configuration, it is possible to route optical fibers into the connector housing for fusion splicing and storage of the splices within splice trays.

Splice shelf assembly 70 includes a splice shelf 72 that has a first portion 72a and a second portion 72b with hingable portion therebetween so that second portion 72b may rotate with respect to first portion 72a. When assembled, first portion 72a of splice shelf 70 is secured to connector housing 12. More specifically, first portion 72a is secured to second side panel 15 using wing nuts that thread onto studs (not numbered) of second side panel 15. Of course, first portion 72a of splice shelf 72 could be attached on other sides or panels of connector housing 12 such as first side panel 14 and/or use other securement means such as welding, hex nuts, or clips. When installed, second portion 72b of splice shelf 70 rotates about a generally vertical axis and when in the fully open extends beyond rear panel 18 as shown in FIG. 6. Splice shelf assembly 70 is advantageous because it rotates the slack storage of cables/optical waveguides attached and/or spliced thereon when splice shelf assembly 70 rotates. In other words, the slack storage of cables/optical waveguides is easily moved and inhibits stresses and/or strain on the same, thereby allowing the craftsman quick and easy access to rear of adapter panels 23. Stress and/or strain are generally minimized since the cable/optical waveguides merely rotate about a point.

As shown, splice shelf assembly 70 also includes a splice tray organizer 74, a latch mechanism 76, a plurality of cable routing guides 77, and a support trough 78 that may include a decal. Tray organizer 74 is attached to second portion 72b of splice shelf 72 and has a plurality of shelves (not numbered) for holding a plurality splice trays 85 as depicted in FIGS. 7 and 8. Splice trays 85 are used for storing the splices between optical waveguides; however, splice trays 85 do not form a portion splice shelf assembly 70. Splice shelf assembly may also include a latch mechanism 76 for securing second portion 72b in a closed position within the interior space of connector housing 10'. Latch mechanism 76 engages a stop bracket 80 that in this case is mounted to bottom panel 13 of housing assembly 12 using a wing nut as best shown in FIG. 8. Using this mounting configuration for stop bracket 80 advantageously allows for easy configuration changes, but stop bracket 80 could be mounted in other ways and/or locations. Additionally, other latching mechanisms for securing splice shelf assembly 70 from unintended rotation are also possible such as a detent or a magnet.

Splice shelf assembly 70 also includes a plurality of cable routing guides for aiding in the organization and routing of cables/optical waveguides. Additionally, as shown in FIG. 8 an end 72c of splice shelf 72 has a generally curved portion. The generally curved portion of end 72c is for maintaining a predetermined bend radius as cable/optical waveguides are routed from a backside of splice shelf 72 to the front side having tray organizer 74. Furthermore, splice shelf assembly 72 further includes a plurality of cable routing guides 77 and fiber support trough 78 for cable/optical waveguide routing, securement and management, thereby aiding the rotation of the cable/optical with splice shelf assembly 70. The splice shelf assembly may also include a splice identification panel or label for recording network connections. Of course other configurations of the splice shelf assembly are possible and within the scope of the present invention, for instance, other configuration or types of tray organizers and/or splice shelves may be used.

Figure 10:
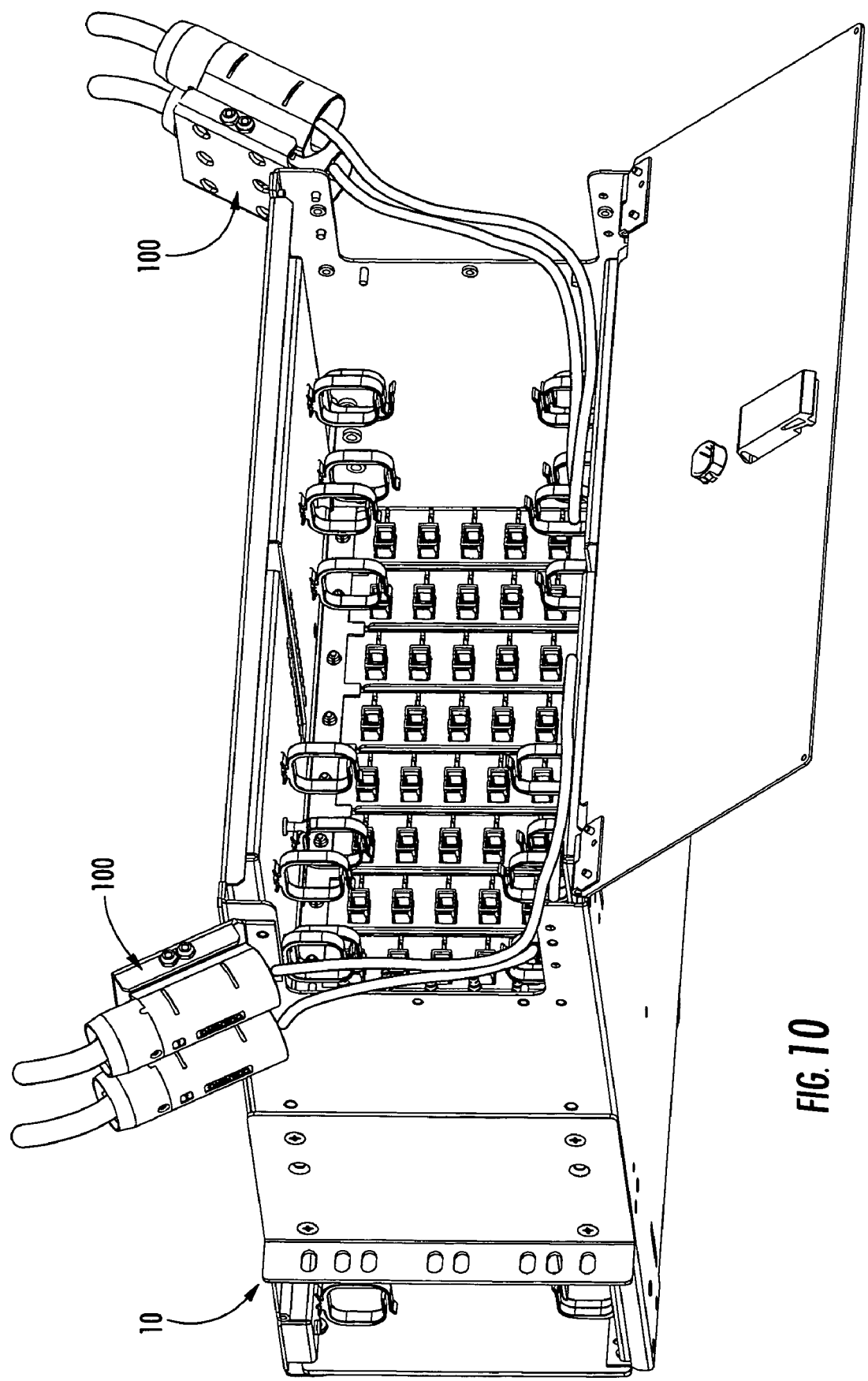
FIG. 10 depicts the connector housing of FIG. 1 having portions of cable assemblies being attached to another configuration of a strain relief bracket assembly and entering the connector housing according to the present invention.

FIGS. 10 and 11 depict a strain relief bracket assembly 100 of the present invention having a different configuration. FIG. 10 shows two strain relief bracket assemblies 100 attached to respective opposite sides of connector housing 10. As best shown in FIG. 11, strain relief bracket assembly 100 includes a strain relief bracket 101, at least one furcation plug 102 that forms a portion of a cable assembly (not shown), at least mounting rail 104, and mounting hardware 106. Generally speaking, furcation plug 102 is a portion of a cable assembly and may form the transition point where a larger cable is furcated into a plurality of units having fewer optical waveguides than the entirety of the larger cable. Furcation plug 102 has a channel portion 102a that generally runs along a portion of a longitudinal length of furcation plug 102. Channel portion 102a may cooperate with a mounting rail 104 that acts as a mounting adapter and is sized for allowing channel portion 102a to slide snuggly thereon. Mounting rail 104 also includes a tab portion 104a having a pair of apertures (not numbered) for securing the same to strain relief bracket 101 using mounting hardware. Thus, furcation plug 102 of the cable assembly is quickly and easily mounted and/or removed from mounting rail 104 by the craftsman without tools. Mounting rail 104 is attached to strain relief bracket 101 using suitable mounting hardware 106. For instance, mounting hardware 106 is a pair of studs and nuts; however, other suitable mounting hardware such as bolts and nuts are possible. In this case, the studs are inserted through apertures in strain relief bracket 101 having a predetermined spacing that matches the spacing of the apertures in tab 104a as shown. Additionally, strain relief bracket 101 can be configured for mounting more than one furcation plug 102 as depicted. FIG. 11a depicts another embodiment where mounting rail that acts as an adapter is integrated into strain relief bracket 101'. In this case, strain relief bracket 101' includes a mounting rail 101a forming thereon for securing furcation plug 102 by engaging channel 102a. Additionally, other configurations for mounting furcation plug 102 using the concepts of the present invention are possible.

Furthermore, connector housings of the present invention can include other advantageous features. By way of example, front panel 16 may include an aperture having an insert 16b that is removable so that an optional locking mechanism (not shown) may be attached, thereby restricting access of connector housing 10 to authorized personnel. Likewise, rear panel 18 may also have an aperture for receiving a locking mechanism. Additionally, as depicted in FIG. 3, the projection of connector housing 10 from the distribution frame can be varied by moving rack mounts 24 into different mounting positions along sides 14, 15 using the plurality of threaded bores (not numbered) thereon. Connector housings of the present invention may also include a panel 90 as shown in FIG. 3 having a decal that extends and stores into the connector housing so that the craftsman can record the interconnection of links in the communication network.

Many modifications and other embodiments of the present invention, within the scope of the appended claims, will become apparent to a skilled artisan. For example, the connector housing can have other configurations such as a larger height, or different width thereby occupying more rack space. Additionally, the connector housing can have one or more jumper management panels that can be located in other locations such as at the rear of the connector housing. Moreover, the jumper management panel can include more than two positions. Therefore, it is to be understood that the invention is not to be limited to the specific embodiments disclosed and that modifications and other embodiments may be made within the scope of the appended claims. Although specific terms are employed herein, they are used in a generic and descriptive sense only and not for purposes of limitation. The invention has been described with reference to an optical connector housing, but the inventive concepts of the present invention are applicable to other suitable communication networks as well.

That which is claimed:

1. A connector housing for a communications network comprising:
    a housing assembly having a front panel that is rotatable, a rear panel that is rotatable, a first side panel, a second side panel, a bottom panel, and a top panel; and
    a jumper management panel, the jumper management panel being a portion of the top panel and is rotatable into at least two different positions relative to a stationary portion of the top panel of the housing assembly, wherein a first position of the jumper management panel is substantially co-planer with a plane defined by the stationary portion of the top panel, and a second position of the jumper management panel is an upright position with respect to the plane.

2. The connector housing of claim 1, further including a bracket for securing the jumper management panel in the upright position.

3. The connector housing of claim 1, the jumper management panel having a plurality of cable routing guides.

4. The connector housing of claim 1, further including a splice shelf assembly, the splice shelf assembly being attached to the housing assembly and rotatable relative to the housing assembly.

5. The connector housing of claim 4, the splice shelf assembly being rotatable about a generally vertical axis.

6. The connector housing of claim 4, the splice shelf assembly having a latch mechanism for securing the splice shelf assembly in a stored position.

7. The connector housing of claim 4, the splice shelf assembly being removably attached to a side panel of the housing assembly.

8. The connector housing of claim 1, further comprising at least one fiber management shelf that is detachable, the fiber management shelf having a plurality of cable routing guides thereon.

9. The connector housing of claim 1, further comprising at least one cable entry plate, wherein the cable entry plate is removably attached to a first side panel of the housing assembly when removed it creates an opening to the rear of the connector housing for cable routing.

10. The connector housing of claim 1, further comprising at least one strain relief bracket attached to the housing assembly.

11. The connector housing of claim 10, further comprising a furcation plug of a cable assembly being attached to a mounting rail that is secured to the strain relief bracket.

12. The connector housing of claim 10, further comprising a furcation plug of a cable assembly being attached to a mounting rail that forms an integral portion of the strain relief bracket.

13. The connector housing of claim 1, the front panel having an aperture for receiving a locking mechanism.

14. The connector housing of claim 1, further comprising a plurality of mounting positions for adjusting the projection of a rack-mount bracket.

15. A connector housing for a communications network comprising:
   a housing assembly having a front panel that is rotatable, a rear panel that is rotatable, a first side panel, a second side panel, a bottom panel, and a top panel;
   a splice shelf assembly, the splice shelf assembly being attached to the housing assembly and rotatable relative to the housing assembly about a generally vertical axis, the splice shelf assembly being able to hold optical waveguides, thereby allowing the optical waveguide to rotate with the splice shelf assembly; and
   a jumper management panel, the jumper management panel being a portion of the top panel and is rotatable into at least two different positions relative to a stationary portion of the top panel of the housing assembly, wherein a first position of the jumper management panel is substantially co-planer with a plane defined by the stationary portion of the top panel, and a second position of the jumper management panel is an upright position with respect to the plane.

16. The connector housing of claim 15, the splice shelf assembly having a latch mechanism for securing the splice shelf assembly in a stored position.

17. The connector housing of claim 15, the splice shelf assembly extending beyond the rear panel when rotated into the fully rotated position.

18. The connector housing of claim 15, the splice shelf assembly being removably attached to a side panel of the housing assembly.

19. The connector housing of claim 15, further including a bracket for securing the jumper management panel in an upright position.

20. The connector housing of claim 15, the jumper management panel having a plurality of cable routing guides.

21. The connector housing of claim 15, further comprising at least one cable entry plate, wherein the cable entry plate is removably attached to a first side panel of the housing assembly when removed it creates an opening to the rear of the connector housing for cable routing.

22. The connector housing of claim 15, further comprising at least one strain relief bracket attached to the housing assembly.

23. The connector housing of claim 22, further comprising a furcation plug of a cable assembly being attached to a mounting rail that is secured to the strain relief bracket.

24. The connector housing of claim 22, further comprising a furcation plug of a cable assembly being attached to a mounting rail that forms an integral portion of the strain relief bracket.

25. The connector housing of claim 15, the front panel having an aperture for receiving a locking mechanism.

26. The connector housing of claim 15, further comprising a plurality of mounting positions for adjusting the projection of a rack-mount bracket.

27. A connector housing for a communications network comprising:
   a housing assembly having a front panel, a rear panel, a first side panel, a second side panel, a top panel, and a bottom panel;
   at least one cable entry plate, wherein the cable entry plate is removably attached to a first side panel of the housing assembly so that it can be removed, thereby creating an opening to the rear of the connector housing; and
   a jumper management panel, the jumper management panel being a portion of the top panel and is rotatable into at least two different positions relative to a stationary portion of the top panel of the housing assembly, wherein a first position of the jumper management panel is substantially co-planer with a plane defined by the stationary portion of the top panel, and a second position of the jumper management panel is an upright position with respect to the plane.

28. The connector housing of claim 27, further comprising a splice shelf assembly, the splice shelf assembly being attached to the housing assembly and rotatable relative to the housing assembly.

29. The connector housing of claim 27, the splice shelf assembly being rotatable about a generally vertical axis.

30. The connector housing of claim 27, the splice shelf assembly having a latch mechanism for securing the splice shelf assembly in a stored position.

31. The connector housing of claim 27, the splice shelf assembly being removably attached to a side panel of the housing assembly.

32. The connector housing of claim 27, further comprising at least one fiber management shelf that is detachable, the fiber management shelf having a plurality of cable routing guides thereon.

33. The connector housing of claim 27, the jumper management panel being securable in the uptight position by a bracket.

34. The connector housing of claim 27, the jumper management panel having a plurality of cable routing guides.

35. The connector housing of claim 27, further comprising at least one strain relief bracket attached to the housing assembly.

36. The connector housing of claim 35, further comprising a furcation plug of a cable assembly being attached to a mounting rail that is secured to the strain relief bracket.

37. The connector housing of claim 35, further comprising a furcation plug of a cable assembly being attached to a mounting rail that forms an integral portion of the strain relief bracket.

38. The connector housing of claim 27, the front panel having an aperture for receiving a locking mechanism.

39. The connector housing of claim 27, further comprising a plurality of mounting positions for adjusting the projection of a rack-mount bracket.

* * * * *